United States Patent [19]

Merciadis

[11] 3,884,082

[45] May 20, 1975

[54] VACUUM DISTILLATION SAMPLING APPARATUS

[75] Inventor: Gregory C. Merciadis, Modesto, Calif.

[73] Assignee: Shell Oil Company, Houston, Tex.

[22] Filed: Apr. 16, 1973

[21] Appl. No.: 351,216

[52] U.S. Cl. .......................................... 73/422 TC
[51] Int. Cl. .............................................. G01n 1/10
[58] Field of Search ..... 73/422 TC; 201/1; 202/258, 202/270; 203/1

[56] References Cited
UNITED STATES PATENTS

| | | | |
|---|---|---|---|
| 1,562,121 | 11/1925 | Newton | 73/422 TC |
| 1,837,858 | 12/1931 | Grace | 73/422 TC |
| 2,450,715 | 10/1948 | Campbell | 73/422 TC |

Primary Examiner—S. Clement Swisher

[57] ABSTRACT

A device for sampling liquid distillate during distillation comprising an assembly fitted to the distillation apparatus between the condenser and the collection vessel and having a primary fluid passage fitted with a sampling valve having inlet, outlet, and sampling ports and a rotatable valve member adjustably positioned therein and a secondary fluid passage by-passing the sampling valve so that the distillation can continue without interruption while the sampling process is being carried out.

2 Claims, 6 Drawing Figures

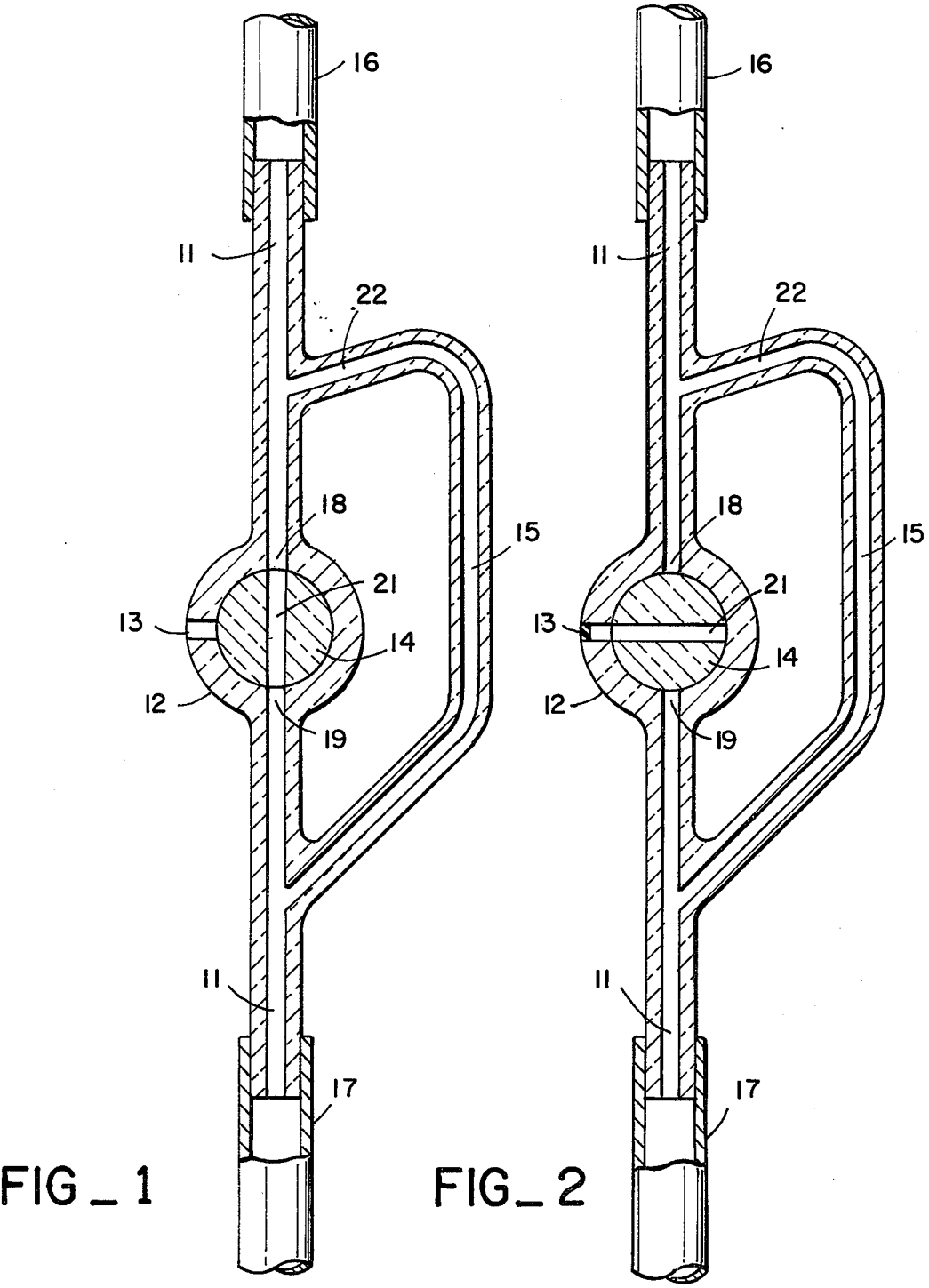
FIG_1    FIG_2

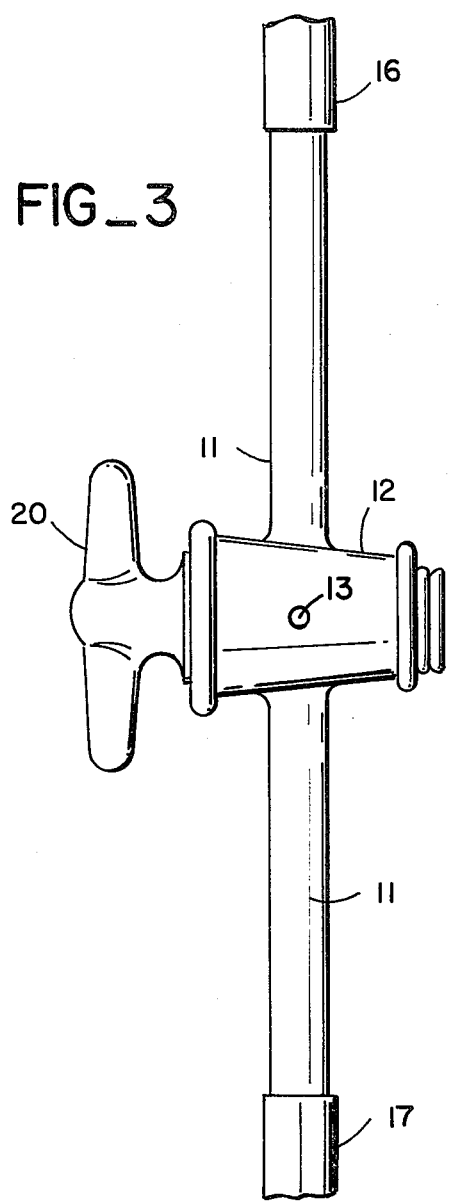
FIG_3
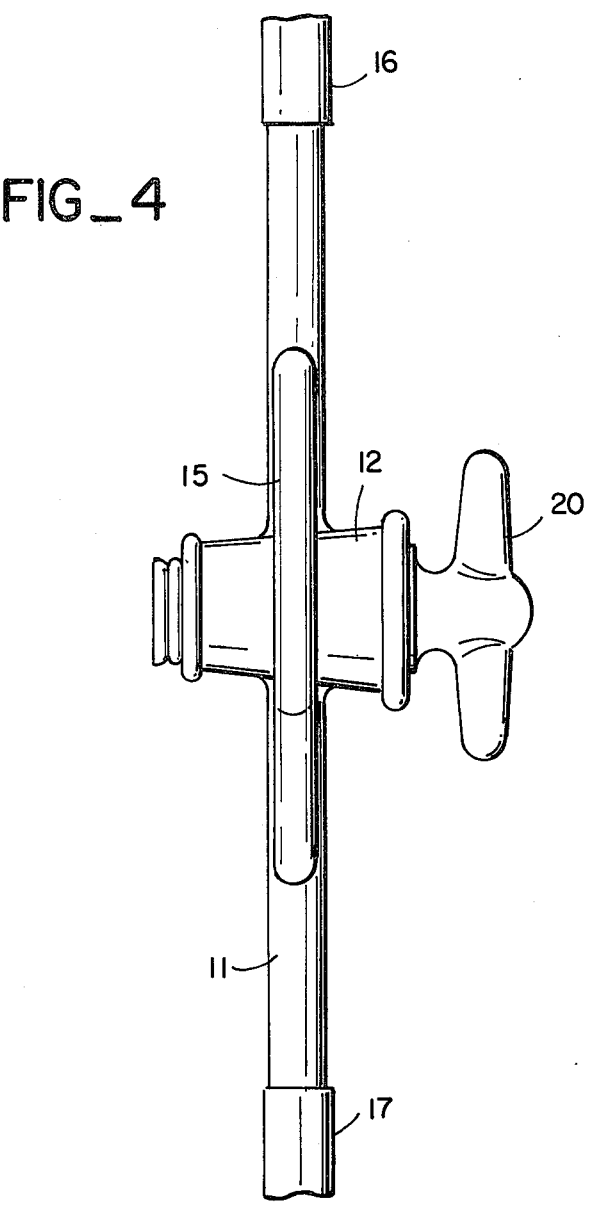
FIG_4
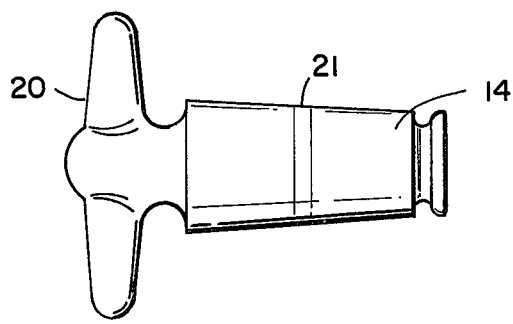
FIG_6
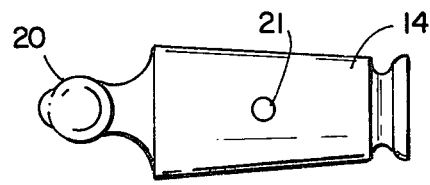
FIG_5

VACUUM DISTILLATION SAMPLING APPARATUS

FIELD OF THE INVENTION

This invention relates to fluid sampling devices. More particularly, it relates to fluid sampling devices adapted for withdrawing a small sample of liquid distillate without interrupting of the continuity of the distillation.

BACKGROUND OF THE INVENTION

Although the invention has broad areas of application, it was developed primarily to solve laboratory problems associated with the purification and separation by distillation of various components of a mixture.

Distillation is a commonly used technique for separating and/or purifying mixtures of chemical compounds having different boiling points. Using conventional distillation equipment, the mixture is heated until it boils and the vapor is then partially condensed. The uncondensed vapor, called "overhead product" or "distillate" continues through the condensing equipment and is collected in another vessel. Before the distillate is condensed, its temperature is measured, usually with a thermometer. Ordinarily, the distillate has one fairly constant temperature as the lowest boiling component is distilled. After a period of time, the lowest boiling component will have been distilled into the collection vessel and the next higher boiling component proceeds to distill through the condensing equipment. This change in composition of the distillate is accompanied by a rise in the temperature of the distillate. When the person carrying out the distillation notices the rise in temperature caused by the change in composition, he must then change the collection vessel so that the first component will not be contaminated by the second.

If the components of the mixture have close boiling points or if they are slightly impure, there may not be a sharply defined rise in the temperature of the distillate. Under these circumstances, it is virtually impossible to tell when a new component is being distilled unless the material is subjected to analysis, for example, by gas chromatography or thin layer chromatography. However, in order to get a sample of liquid distillate to analyze, the distillation has to be stopped so that the collection vessel can be removed from the distillation apparatus and the sample then withdrawn from the collection vessel. This procedure is time consuming and awkward.

Accordingly, it is the primary aim of this invention to provide a distillation sampling apparatus which can be used to withdraw samples of liquid distillate without interrupting the distillation.

It is also an object of this invention to provide a distillation sampling device which can be used to withdraw samples of liquid distillate without exposing the sample to contact with air, moisture, or other components of the surrounding environment.

A further object of the invention is to provide a device which can be used to take samples quickly and with a minimum of effort.

Other objects of the invention are to provide an improved device of the character described that is easily and economically produced, easy to use and highly efficient in operation.

SUMMARY OF THE INVENTION

In accordance with the invention there is provided a distillation sampling device designed to be fitted onto the off-take portion of a distillation apparatus and consisting of 1. a primary fluid passage fitted with a sampling valve having an outer body portion provided with inlet, outlet, and sampling ports and a valve member having a flow channel that can be moved from a flow position to a sampling position and
2. a secondary fluid passage connected to the primary fluid passage at a point above and a point below the sampling valve, and providing a means for maintaining the integrity of the distillation during the sampling operation.

BRIEF DESCRIPTION OF THE DRAWINGS

Other objects and advantages of the invention will become apparent upon reading the following detailed description and upon reference to the drawings, in which:

FIG. 1 is a side view of the device in which the rotatable valve member is in the flow position;

FIG. 2 is a side view of the device in which the rotatable valve member is in the sampling position;

FIG. 3 is a side view of the device at 90° to the views in FIGS. 1 and 2, and facing the sampling port;

FIG. 4 is a side view of the device at 90° to the views in FIGS. 1 and 2, at 180° to the view in FIG. 3, and facing the secondary fluid passage.

FIGS. 5 and 6 are two side views of the valve member, looking through the flow channel and at 90° thereto, respectively.

In FIGS. 1 and 2, the handle of the rotatable valve member has been omitted, to simplify the drawings.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DESCRIPTION OF THE PREFERRED EMBODIMENT

Referring now to the drawings wherein like reference numerals indicate like parts, it will be observed that the embodiment of the invention shown in FIG. 1 includes (a) a primary fluid passage 11 interrupted by (b) the sampling valve, which consists of the body or housing 12 having sampling port 13 in the wall thereof, and the rotatable member 14, and (c) a secondary fluid passage 15 connected to the primary fluid passage at points above and below the sampling valve. The sampling valve bears a superficial resemblance to a conventional stopcock.

The primary fluid passage is essentially a hollow tube provided with connecting means 16 adapted for attaching the device to the off-take portion of the condensing portion of the distillation apparatus, and a connecting means 17 adapted for attaching the device to the collection vessel wherein the desired product will be collected. While any conventional connecting means can be used, preferred would be ones that provide an air- and fluid-tight seal.

The housing may be generally described as a hollow tube, pierced by diametrically opposed holes or ports (inlet port 18, outlet port 19) which are fitted to the two portions of the primary fluid passage, a sampling hole or port 13, and a rotatable valve member 14 fitted in the hollow interior thereof. The rotatable valve member contains a handle 20, and flow passage 21 therein, so positioned as to align with the ports 18 and 19 when the rotatable valve member is in the flow position and align with sampling port 13 when it is in the sampling position. The sampling port 13 may be placed at any point between the inlet port 18 and the outlet port 19. As a matter of convenience, the sampling port 13, as shown in FIGS. 1 and 2, may be placed equidistant between the inlet port 18 and the outlet port 19.

The secondary fluid passage 15 may be described as a hollow tube and may be of any shape. Preferably it has a slightly ascending portion 22.

The rotatable valve member 14 preferably is tapered, and matches the hollow interior of the housing, to prevent leakage which may be effected in a known manner as, for example by machining, grinding, lapping, polishing, etc. and aided, if desired, by a film of lubricant. The rotatable valve member 14 may be retained within the housing 12 in any conventional manner by urging the tapered valve member into the matching internal taper of the body portion. The flow channel 21 must have a diameter less than the spacing between the sampling port 13 and the inlet port 18 or the outlet port 19 so that said channel cannot connect said sampling port to said inlet and outlets ports in any position of the rotatable valve member 14.

The operation of the embodiment shown in the figures is relatively simple and foolproof. The primary fluid passage is connected to a conventional distillation apparatus so that when the rotatable valve member 14 is in the flow position, liquid distillate from the distillation flows into the primary fluid passage, through the sampling valve, back into the primary fluid passage, and into the collection vessel. It is immediately obvious that the fluid flow through this path is unobstructed. When it is desired to sample the liquid in the primary fluid passageway 11, the handle 20 is turned so that the flow channel 21 is aligned with the sampling port 13. When the handle is turned, a small portion of distillate is trapped in the flow channel 21. A conventional sampling device, such as a hypodermic needle or a capillary tube, is then inserted through the sampling port into the flow channel. If desired, the sampling port may be protected from contamination by air, moisture, etc. by covering it with an impermeable barrier, for example, a septum, removable cap or serum cap made of natural or synthetic rubber, or of plastic. The sample can then be withdrawn and analyzed. While this sampling procedure is being carried out, fluid continues to enter the primary fluid passage 11. Because the rotatable valve member 14 is turned to the sampling position, the fluid cannot continue directly into the collection vessel and fluid backs up in the primary fluid passage. As this fluid accumulates, it flows into the secondary fluid passage 22 rather than back into the distillation apparatus. Ordinarily, only a small amount of liquid will accumulate during the short time ordinarily required for taking the sample; it is desirable that the secondary fluid passage 15 contains the ascending portion 22, because during sampling the accumulating liquid will remain in the ascending portion, rather than continuing down the secondary fluid passage 15 and into the lower portion of the primary fluid passage 11. This technique minimizes unsteady state conditions in conducting the distillation. When the distillation is being carried out under vacuum, e.g., at a pressure less than atmospheric, the secondary fluid passage 15 allows the vacuum in the collection vessel to be easily maintained during the sampling procedure.

The apparatus of the invention may be constructed from a wide variety of materials provided only that the materials are impervious and chemically resistant to the fluid being sampled. Examples of suitable materials include glass, ferrous and non-ferrous metals, plastics, ceramics, and the like.

While particular embodiments of the invention have been illustrated and described herein, it is not intended to limit the invention to such specific disclosure but changes and modifications may be made therein and thereto within the scope of the following claims.

What is claimed is:

1. A sampling device for sampling liquid distillate during distillation comprising a fixed assembly designed to be fitted onto the off-take portion of a distillation apparatus from which samples are to be taken and having
   a. a primary fluid passage fitted with
   b. a sampling valve comprising a body portion having walls and a hollow interior, said walls containing an inlet port, an outlet port, and a sampling port, each extending from the exterior of said wall to the hollow interior thereof, said inlet and outlet ports being positioned on diametrically opposite sides of the walls and said sampling port being between said inlet and outlet ports, and including a rotatable valve member adjustably positioned within said hollow interior and provided with a flow channel therethrough, said flow channel having a diameter less than the distance between the inlet port and the sampling port and less than the distance between the sampling port and the outlet port, and said valve member being movable between a substantially vertical flow position wherein said channel connects said inlet and outlets ports so that fluid flowing through the primary fluid passage flows through said channel, and a substantially horizontal sampling position wherein said channel communicates with the discharge port and
   c. a secondary fluid passage opening into the primary fluid passage at a point above and a point below said sampling valve and by-passing said sampling valve thereby permitting uninterrupted distillation while the sampling valve is in the sampling position.

2. The sampling device of claim 1 wherein the sampling port is covered with an impermeable barrier through which a sampling device can be inserted.

* * * * *